US006162551A

United States Patent [19]
Watanabe

[11] Patent Number: 6,162,551
[45] Date of Patent: Dec. 19, 2000

[54] ALLOY USED FOR JOINING TO CEMENTED CARBIDE, AND ITS COMPOSITE MATERIAL

[75] Inventor: Yasushi Watanabe, Chita, Japan

[73] Assignee: Daido Tokushuko Kabushiki Kaisha, Nagoya, Japan

[21] Appl. No.: 09/116,463

[22] Filed: Jul. 16, 1998

[30] Foreign Application Priority Data

Jul. 17, 1997 [JP] Japan .................................. 9-192628
Jan. 12, 1998 [JP] Japan ................................ 10-003969

[51] Int. Cl.$^7$ ...................................... B32B 15/04
[52] U.S. Cl. ........................ 428/627; 428/679; 428/469; 420/435; 420/459; 420/580; 420/581; 228/121; 228/122.1; 228/124.5
[58] Field of Search .................... 428/627, 639, 428/679, 469; 420/435, 459, 580, 581; 228/121, 122.1, 124.5; 75/240

[56] References Cited

U.S. PATENT DOCUMENTS

| | | | |
|---|---|---|---|
| 3,630,699 | 12/1971 | Catlin et al. | 51/293 |
| 4,129,444 | 12/1978 | Dreyer et al. . | |
| 4,280,841 | 7/1981 | Ito et al. . | |
| 4,911,768 | 3/1990 | Dong et al. | 148/427 |

FOREIGN PATENT DOCUMENTS

| | | |
|---|---|---|
| 60-199594 | 10/1985 | Japan . |
| 61-012843 | 1/1986 | Japan . |
| 61-293696 | 12/1986 | Japan . |

OTHER PUBLICATIONS

Weber et al.; Components from cobalt. Hard alloys for galvanization of steel strip, Deloro Stellite, 1997, 4, 65–69. (No Month).

Knotek et al.; The formation of tungsten carbide in cobalt base wear resistant coating alloys, thin solid films, 1976, 39, 263–8, (No Month).

*Primary Examiner*—Deborah Jones
*Assistant Examiner*—Jason D Resnick
*Attorney, Agent, or Firm*—Arent Fox Kintner Plotkin & Kahn, PLC

[57] ABSTRACT

A joining alloy of the invention is based on Co, Ni, or their alloy, and contains 1.0 to 2.3% by mass of C and 15.5 to 34.7% by mass of W. Using HIP, the joining alloy in the form of a casting or powders is integrated with a WC—Co or WC—Ni type cemented carbide via diffusion joining. Using HIP, it is also possible to obtain a composite material having an integral structure in which a cemented carbide and the joining alloy, and the joining alloy and steel are joined together via diffusion joining. The joining alloy may additionally contain up to 30% by mass of Fe, up to 3% by mass of Si and up to 3% by mass of Mn as well as up to 10% by mass of at least one selected from Cr, Mo, V, Nb, Ti, Zr, and Ta. It is thus possible to obtain a joining alloy having an improved joining strength without producing a brittle phase therein even upon joined to the WC—Co or WC—Ni type cemented carbide, and its composite material.

10 Claims, No Drawings

ALLOY USED FOR JOINING TO CEMENTED CARBIDE, AND ITS COMPOSITE MATERIAL

BACKGROUND OF THE INVENTION

The present invention relates to an alloy used for joining to cemented carbide useful for wear-resistant tools or cutting tools, and its composite material.

Cemented carbide comprising hard grains of carbides, nitrides or the like bound with a binding phase are useful for cutting tools, plastic working tools such as rolls and punches, and drilling tools for civil engineering, and mining purposes, because of their excellent hardness and wear resistance. However, grave problems with cemented carbide are that they cost much due to difficulty involved in machining, and that they have limited application because of susceptibility to damage due to their low toughness. Included in approaches to overcoming such difficulty or limitation are the brazing and welding, and mechanical fixing, e.g., screwing or shrink fitting of cemented carbide to a matrix material that is inexpensive and excellent in machinability, e.g., steel, thereby obtaining composite materials.

The mechanical fixing such as screwing, shrink fitting, and clamping entails extra work for the fixing of a hard-to-machine cemented carbide, resulting in an unavoidable limitation on its application in view of shape, and machining. When the brazing material is used, the brazing material or cemented carbide may often crack due to internal stress based on a difference in the coefficient of thermal expansion between the brazing material, cemented carbide, and matrix material. Another problem with the use of the brazing material is that it has a melting point lower than that of the cemented carbide or matrix material, and so it yields a composite material having a low heat-resisting temperature and, hence, a reduced strength.

Such a problem with the use of the brazing material may possibly be averted by joining the matrix material directly to the cemented carbide through diffusion joining. When, for instance, steel is diffusion-joined to a WC—Co type cemented carbide that is one of most representative cemented carbide, however, there is a problem that any sound junction is not obtained because of the generation of thermal stress due to a large thermal expansion difference, as in the case of the aforesaid brazing, and a brittle phase is formed in a diffusion layer. In the case of the joining of steel to a WC—Ni type cemented carbide, too, any sound junction is not obtained by diffusion joining.

Accordingly, it is an object of the present invention to provide a joining alloy which, even upon joined to a WC—Co or WC—Ni type cemented carbide, ensures high-enough joining strength with no formation of a brittle phase in the junction. Another object of the invention is to provide an inexpensive cemented carbide composite of high reliability, high strength and high performance, which comprises a cemented carbide-joining alloy-steel system.

SUMMARY OF THE INVENTION

These objects are achieved by the embodiments defined below as (1) to (6).

(1) An alloy for joining to a cemented carbide, characterized by comprising 1.0 to 2.3% by mass of carbon and 15.5 to 34.7% by mass of tungsten as alloy components, with the rest being cobalt and/or nickel as well as an inevitable impurity.

(2) An alloy for joining to a cemented carbide, characterized by comprising 1.0 to 2.3% by mass of carbon, 15.5 to 34.7% by mass of tungsten and up to 30% by mass of iron as alloy components, with the rest being cobalt and/or nickel as well as an inevitable impurity.

(3) The alloy according to (1) or (2), characterized by further comprising up to 3% by mass of silicon and up to 3% by mass of manganese.

(4) The alloy according to any one of (1) to (3), characterized by further comprising up to 10% by mass of at least one element selected from a group consisting of chromium, molybdenum, vanadium, niobium, titanium, zirconium, and tantalum.

(5) A composite comprising a cemented carbide and a joining alloy joined to said cemented carbide to form an integral structure, characterized in that said joining alloy is an alloy as recited in any one of (1) to (4).

(6) A composite comprising a cemented carbide, a joining alloy joined to said cemented carbide and steel joined to said joining alloy to form an integral structure, characterized in that said joining alloy is an alloy as recited in any one of (1) to (4).

DETAILED EXPLANATION OF THE PREFERRED EMBODIMENT DESCRIPTION

In what follows, the present invention will be explained at great length with reference to the best embodiment thereof.

According to the present invention, it has been found that for a WC—Co or WC—Ni type cemented carbide composed mainly of hard grains of tungsten carbide or WC and bound with a binding phase consisting of cobalt or Co, nickel or Ni, and their alloy it is important to obtain a sound structure free of a η phase or free carbon that embrittles the alloy, and to this end it is required to place the content of each alloy component inclusive of carbon or C under strict control.

That is, a sound cemented carbide comprises a hard grain and a binding phase (γ) of Co, Ni or the like that is rich in ductility. When the hard grain is WC, the amount of bound carbon is 6.13%. A WC-16% Co type cemented carbide, for instance, comprises two phases of WC plus γ at a bound carbon amount of 6.06 to 6.3%. When the bound carbon amount does not reach 6.06%, however, the alloy is embrittled due to the formation of the η phase. At a bound carbon amount exceeding 6.3%, on the other hand, the cemented carbide is again embrittled due to the formation of free carbon.

Here consider the case where a cemented carbide is joined to other metal at a given temperature. If, at that joining temperature, the C potential of the metal (called the joining metal) to be joined to the cemented carbide is lower than that of the binding phase (γ) in the cemented carbide, carbon then diffuses from the cemented carbide into the joining metal, resulting in a drop of the C content of the binding phase in the cemented carbide. Similarly, a drop of the Co content of the binding phase in the cemented carbide, too, promotes the formation of the η phase. If the C potential of the joining metal is higher than that of the cemented carbide, the joining interface between the joining metal and the cemented carbide is then embrittled due to the formation of free carbon at that joining interface.

A particular object of the present invention is to reduce the C and Co or Ni content changes at the joining interface during joining as much as possible, thereby obtaining a sound junction.

The term "cemented carbide" used herein is understood to include alloys composed mainly of WC hard grains. It is also understood that a part of WC may be substituted by a carbide or nitride of at least one element selected from the group consisting of chromium or Cr, molybdenum or Mo, vanadium or V, niobium or Nb, titanium or Ti, zirconium or Zr, and tantalum or Ta. The term "binding phase in the cemented carbide" used herein is understood to be mainly composed of Co or Ni or their alloy, and contain the elements forming the hard grains in the cemented carbide in an amount in equilibrium with the binding phase.

Limitations on the chemical composition of the alloy for joining to the cemented carbide according to the present invention are explained below.

The joining alloy of the present invention is joined to a cemented carbide via diffusion. In this case, a joining temperature of lower than 1,000° C. is not preferable because joining is unachievable, or much heating time and excessive pressure are required for joining. A joining temperature exceeding 1,300° C. is again not preferable because the cemented carbide is largely deformed due to the formation of a liquid phase therein.

In the present invention, the joining alloy comprising 1.0 to 2.3% by mass of carbon and 15.5 to 34.7% by mass of tungsten with the rest being cobalt and/or nickel is used as an alloy corresponding to the chemical composition of the binding phase in the cemented carbide at a temperature of 1,000 to 1,300° C. at which they can be substantially joined together via diffusion joining.

When the carbon content does not reach 1.0% by mass or the tungsten content exceeds 34.7% by mass, the junction of the cemented carbide with the joining alloy is embrittled due to the formation of the η phase at the joining interface between them. When the carbon content exceeds 2.3% by mass or the tungsten content does not reach 15.5% by mass, the junction of the cemented carbide with the joining alloy is again embrittled due to the formation of free carbon at the joining interface between them. Preferably, the contents of carbon and tungsten are of the order of 1:15.3 to 16.5 as calculated as WC equivalents or the content of WC is in the range of 15 to 37% by mass.

Iron or Fe is added to the joining alloy for the purpose of cutting down its cost. It is to be noted, however, that Fe is an element likely to form the η phase at the joining interface between the cemented carbide and the joining alloy. It is thus preferable that the upper limit on the Fe content is 30% by mass because, at an Fe content exceeding 30% by mass, the joining interface between the cemented carbide and the joining alloy is embrittled.

Silicon or Si, and manganese or Mn are added to the joining alloy for the purpose of deacidifying an alloy melt. The joining alloy for joining to the cemented carbide according to the present invention is available in the form of not only castings or alloy powders. In particular, the addition of Si, and Mn is very effective for prevention of a clogging problem with a atomizing nozzle, which is often encountered in the direct production of alloy powders from melts. To achieve this effect without departing from the purport of the present invention, up to 3% by mass of silicon, and up to 3% by mass of manganese can be added to the joining alloy.

When a part of WC in the cemented carbide, to which the joining alloy is to be joined, is substituted by the carbide or nitride of at least one element of Cr, Mo, V, Nb, Ti, Zr, and Ta, the joining alloy of the present invention may contain at least one of Cr, Mo, V, Nb, Ti, Zr, and Ta in the total amount of up to 10% by mass. When the total amount of these elements is in excess of 10% by mass, no sound joining of the joining alloy to the cemented carbide is achievable because of their brittleness. This is the reason the upper limit on the content of the substituent element or elements is 10% by mass.

The alloy used for joining to the cemented carbide according to the present invention is available in the form of a cast piece obtained by melting a raw material by means of a conventional melting process and casting the resulting melt. The joining alloy of the invention is also available in the form of powders obtained by atomizing or mechanical pulverizing, which powders may or may not be sintered. Furthermore, the joining alloy of the invention may be provided in the form of a powder compact comprising a powdery mixture of cobalt, tungsten, and carbon, which compact may or may not be sintered. A joining intermediate layer may be formed by plating, sputtering, and evaporation.

When the joining alloy of the present invention is provided in the form of a cast piece or sintered powders, it is first machined into the necessary shape, if required. Then, the thus shaped joining alloy is brought into contact with a cemented carbide at their joining surfaces. Finally, the assembly is heated at a temperature of 1,000 to 1,300° C. while pressure is applied vertically on the joining surfaces, optionally followed by pressurizing, for diffusion joining. In this way, a cemented carbide/joining alloy composite is obtained. In another embodiment of the composite in which a cemented carbide is bonded to steel, the joining alloy is first stacked on the cemented carbide, and steel is then stacked on the joining alloy to form an assembly. Finally, this assembly is pressurized and heated as mentioned just above.

In a third embodiment of the composite having an everhigher joining strength, an encapsulated stack comprising a cemented carbide and the joining alloy of the invention or an encapsulated stack comprising a cemented carbide, the joining alloy of the invention and steel is subjected to HIP, rather than to the aforesaid uniaxial pressurizing and heating.

In a fourth embodiment of the composite material, the joining alloy of the present invention is first joined to a cemented carbide as mentioned above. Then, the joining alloy and steel are joined together by suitable known processes such as welding, pressure welding, and diffusion joining.

When the joining alloy of the present invention is provided in powder form, a cemented carbide/joining alloy composite or a cemented carbide/joining alloy/steel composite is obtainable by the application of the aforesaid HIP process. Another embodiment of the cemented carbide/joining alloy composite material is obtainable by laminating the powder component for the joining alloy of the invention on the powder component for the cemented carbide during or after pressing, followed by sintering.

RESULTS OF EXPERIMENTATION

Experiment 1

Alloys shown in Table 1 were prepared by a melting process using an induction furnace, and formed into ingots, each weighing 5 kg. A joining alloy round rod of 12 mm in diameter and 50 mm in length was cut out of the ¼ position of each ingot. Apart from this, a WC-13% by mass Co cemented carbide round rod of 12 mm in diameter and 50 mm in length was provided.

The joining alloy round rod, together with the cemented carbide round rod placed in a face-to-face relation thereto, was inserted in a mild steel sheath of 12 mm in inner diameter, 5 mm in thickness and 120 mm in length, which was in turn sealed up at a reduced pressure of $10^{-4}$ torr. The thus sealed sheath was treated in a HIP apparatus at 1,200 atm. and 1,200° C. for 3 hours, followed by slow cooling. The sheath material was then removed by a cutting process by turning to obtain a bend test specimen of 8 mm in diameter and 100 mm in length. The bend test specimen was found to be a sound composite material in which the joining alloy was tightly jointed to the cemented carbide.

TABLE 1

| Alloy No. | Chemical Components (% by mass) | | | | |
|---|---|---|---|---|---|
| | Co | Ni | C | W | Other Components |
| No. 1 | bal. | — | 1.25 | 19.1 | Si: 1.2, Mn: 0.9 |
| No. 2 | bal. | — | 2.01 | 30.7 | |
| No. 3 | bal. | 20.2 | 1.98 | 30.3 | |
| No. 4 | — | bal. | 1.82 | 27.8 | |
| No. 5 | bal. | — | 2.00 | 30.0 | |
| No. 6 | bal. | — | 0.90 | 19.9 | |
| No. 7 | steel according to JIS SS41 | | | | |

Each bend test piece was subjected to three-point bend testing with an 80-mm distance between the supports while load was concentrated on the junction of the joining alloy with the cemented carbide. The results are set out in Table 2, indicating that no rupture is found at the junctions of alloy Nos. 1 to 5 with the cemented carbide, or sound joining is achieved.

TABLE 2

Results of Bend Tests

| Ex. No. | Alloy No. | Maximum Stress at Rupture (MPa) | Rupture Site |
|---|---|---|---|
| No. 1 | No. 1 | 1,960 | 2 to 5 mm * |
| No. 2 | No. 2 | 2,050 | 2 to 5 mm * |
| No. 3 | No. 3 | 2,010 | 2 to 5 mm * |
| No. 4 | No. 4 | 1,980 | 2 to 5 mm * |
| No. 5 | No. 5 | 2,100 | 2 to 5 mm * |
| Comp. 1 | No. 6 | x | fracture ** |
| Comp. 2 | No. 7 | x | fracture ** |

*: Rupture occurred at a position of 2 to 5 mm on the cemented carbide side.
**: Fracture occurred from the joining surfaces during machining.

Experiment 2

Joining alloy disks of 12 mm in diameter and 3 mm in thickness were cut out of ingots of alloy Nos. 1 to 5 shown in Table 1. A WC-13% by mass Co cemented carbide round rod of 12 mm in diameter and 50 mm in length and a JIS SKD11 steel round rod of 12 mm in diameter and 50 mm in length were further provided. An assembly, with the cemented carbide round rod, joining alloy disk and steel round rod stacked in the described order, was inserted into a mild steel sheath of 12 mm in inner diameter, 1 mm in thickness and 120 mm in length, which was in turn sealed up at a reduced pressure of $10^{-4}$ torr. The thus sealed sheath was treated in a HIP apparatus at 1,200 atm. and 1,200° C. for 3 hours, followed by slow cooling. The sheath material was then removed by a cutting process by turning to obtain a bend test specimen of 8 mm in diameter and 100 mm in length. This bend test specimen was found to be a sound composite material in which the joining alloy is firmly joined to the cemented carbide.

Each bend test specimen was subjected to three-point bend testing with an 80-mm distance between the supports while load was concentrated on the junction of the joining alloy with the cemented carbide. The results are set out in Table 3, indicating that no rupture is found at the junctions of alloy Nos. 1 to 5 with the cemented carbide, or sound joining is achieved.

TABLE 3

Results of Bend Tests

| Ex. No. | Alloy No. | Maximum Stress at Rupture (MPa) | Rupture Site |
|---|---|---|---|
| No. 6 | No. 1 | 2,030 | 2 to 5 mm * |
| No. 7 | No. 2 | 2,150 | 2 to 5 mm * |
| No. 8 | No. 3 | 2,080 | 2 to 5 mm * |
| No. 9 | No. 4 | 1,980 | 2 to 5 mm * |
| No. 10 | No. 5 | 2,000 | 2 to 5 mm * |

For *, see Table 2.

Experiment 3

A melt of alloy No. 1 shown in Table 1 was atomized into powders, which were then classified to obtain 60 to 300-mesh alloy powders. On the other hand, a WC-13% by mass Co cemented carbide round rod of 12 mm in diameter and 50 mm in length and a JIS SKD11 steel round rod of 12 mm in diameter and 50 mm in length were provided.

First, the cemented carbide round rod was inserted into a mild steel sheath of 12 mm in inner diameter, 5 mm in thickness and 120 mm in length, and the alloy powders (1.24 grams) were then inserted and tamped into the sheath. Subsequently, the steel round rod was inserted into the sheath which was in turn sealed up at a reduced pressure of $10^{-4}$ torr. The thus sealed sheath was treated in a HIP apparatus at 1,200 atm. and 1,200° C. for 3 hours, followed by slow cooling. The sheath material was removed by a cutting process by turning to obtain a bend test specimen of 8 mm in diameter and 100 mm in length. This bend test specimen was found to be a sound composite material in which the joining alloy was firmly joined to the cemented carbide.

Each bend test specimen was subjected to three-point bend testing with an 80-mm distance between the supports while load was concentrated on the junction of the joining alloy with the cemented carbide. The results indicate that no rupture is found at the junctions of alloy Nos. 1 to 5 with the cemented carbide, or sound joining is achieved.

The results of the experiment indicate that according to the present invention, there can be obtained a cemented carbide/joining alloy composite material and a cemented carbide/steel composite material, each having an improved joining strength.

Experiment 4

Alloys shown in Table 4 were prepared by a melting process using an induction furnace, and formed into ingots, each weighing 5 kg. An alloy round rod of 20 mm in diameter and 15 mm in length was cut out of the ¼ position of each ingot. Apart from this, a WC-12% by mass Co cemented carbide rod of 20 mm in diameter and 20 mm in length was provided.

TABLE 4

| Alloy No. | Chemical Components (% by mass) | | | |
|---|---|---|---|---|
| | Ni | Fe | C | W |
| No. 8 | bal. | 10 | 1.25 | 19.1 |
| No. 9 | bal. | 20 | 1.25 | 19.1 |
| No. 10 | bal. | 30 | 1.25 | 19.1 |
| No. 11 | bal. | 40 | 1.25 | 19.1 |

A mild steel sheath, into which the joining alloy rod and cemented carbide rod were inserted in a face-to-face relation, was sealed up at a reduced pressure of $10^{-4}$ torr.

The thus sealed sheath was treated in a HIP apparatus at 1,200 atm. and 1,200° C. for 3 hours, followed by slow cooling. After removal of the sheath material by a cutting process by turning, the rod assembly was cut by wire cutting, and then ground to obtain a bend test specimen including a junction surface in its lengthwise direction and having a thickness of 3.0 mm, a width of 5.0 mm and a length of 30 mm. This bend test specimen was found to be a sound composite material in which the joining alloy was firmly joined to the cemented carbide.

Each bend test specimen was subjected to three-point bend testing with a 20-mm distance between the supports while a thickness-wise load was concentrated on the junction of the joining alloy with the cemented carbide. The results shown in Table 5 teach that the junctions in example Nos. 11 to 13 using alloy Nos. 8 to 10 undergo no rupture and show large values for the maximum stress at rupture, indicating that sound joining is achieved. In comparative example No. 3 using alloy No. 11 having a high Fe content, however, the junction surface ruptures and shows a considerably small value for the maximum stress at rupture.

TABLE 5

| Ex. No. | Alloy No. | Results of Bend Tests | |
|---|---|---|---|
| | | Maximum Stress at Rupture (MPa) | Rupture Site |
| No. 11 | No. 8 | 686 | 2 to 5 mm* |
| No. 12 | No. 9 | 588 | 2 to 5 mm* |
| No. 13 | No. 10 | 392 | 2 to 5 mm* |
| Comp. 3 | No. 11 | 98 | joining surfaces |

For*, see Table 2.

Experiment 5

As in experiment 4, alloy Nos. 12 to 14 having such chemical compositions as shown in Table 6 were joined to superhard materials with Co contents of 6 to 18% by mass to obtain bend test specimens. Each specimen was found to be a sound composite material in which the joining alloy was tightly joined to the cemented carbide.

TABLE 6

| | Chemical Component (% by mass) | | | |
|---|---|---|---|---|
| Alloy No. | Co | Ni | C | W |
| No. 12 | bal. | — | 1.25 | 19.1 |
| No. 13 | — | bal. | 1.25 | 19.1 |
| No. 14 | 12 | bal. | 1.25 | 19.1 |

Each bend test specimen was subjected to three-point bend testing with a 20-mm distance between the supports while a thickness-wise load was concentrated on the junction of the joining alloy with the cemented carbide. The results shown in Table 7 teach that the junctions according to the examples of the present invention undergo no rupture and show large values for the maximum stress at rupture, indicating that sound joining is achieved.

TABLE 7

| | Joined Structure | | Bending Strength |
|---|---|---|---|
| Ex. No. | Cemented carbide | Joining Alloy | (MPa) |
| No. 14 | WC-12% Co | Alloy No. 12 | 1,626 |
| No. 15 | WC-15% Co | Alloy No. 12 | 1,666 |
| No. 16 | WC-18% Co | Alloy No. 12 | 1,744 |

TABLE 7-continued

| No. 17 | WC-6% Co | Alloy No. 13 | 1,274 |
|---|---|---|---|
| No. 18 | WC-9% Co | Alloy No. 13 | 1,470 |
| No. 19 | WC-12% Co | Alloy No. 13 | 1,470 |
| No. 20 | WC-15% Co | Alloy No. 13 | 1,666 |
| No. 21 | WC-18% Co | Alloy No. 13 | 1,742 |
| No. 22 | WC-6% Co | Alloy No. 14 | 1,192 |
| No. 23 | WC-9% Co | Alloy No. 14 | 1,686 |
| No. 24 | WC-12% Co | Alloy No. 14 | 1,804 |

| Ex. No. | Rupture Site | Absorpotion Energy (J) | Maximum Deflection (mm) | State of Deformation |
|---|---|---|---|---|
| No. 14 | 0.5 mm* | 0.08 | 0.12 | S.E.D. |
| No. 15 | 0.5 mm* | 0.11 | 0.16 | S.E.D. |
| No. 16 | 0.5 mm* | 0.12 | 0.17 | S.E.D. |
| No. 17 | 0.5 mm* | 0.05 | 0.09 | P.D. |
| No. 18 | 0.5 mm* | 0.58 | 1.00 | L.P.D. |
| No. 19 | 0.5 mm* | 0.78 | 0.38 | L.P.D. |
| No. 20 | No rupture | 1.03 | 2.29 | V.L.P.D. |
| No. 21 | No rupture | 0.86 | 0.78 | V.L.P.D. |
| No. 22 | 0.5 mm* | 0.11 | 0.17 | P.D. |
| No. 23 | 0.5 mm* | 0.38 | 0.40 | L.P.D. |
| No. 24 | No rupture | 0.83 | 0.91 | V.L.P.D. |

For*, see Table 2.
S.E.D.: Substantially elastic deformation
P.D.: Plastic deformation
L.P.D.: Large plastic deformation
V.L.P.D.: Very large plastic deformation As can be seen from the foregoing, the present invention can provide a joining alloy that ensures that its junction with a WC—Co or WC—Ni type cemented carbide has an improved joining strength without producing a brittle phase therein. By joining the joining alloy and a cemented carbide together, it is possible to provide a composite material having an improved joining strength. The joining alloy portion of this composite can be subjected to known machining, thermal treatment, discharge treatment, and welding, and so can enhance the usefulness of the cemented carbide. By joining a cemented carbide and tough steel together using the joining alloy as an intermediate layer, it is possible to provide an expensive yet reliable cemented carbide/steel composite having an improved joining strength.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An alloy for joining to a cemented carbide, which comprises 1.0 to 2.3% by mass of carbon, 15.5 to 34.7% by mass of tungsten and an amount that is at most 30% by mass of iron as alloy components, with the rest being cobalt and/or nickel as well as an inevitable impurity, and wherein the alloy further comprises up to 10% by mass of chromium.

2. The alloy according to claim 1, which further comprises an amount that is at most 3% by mass of silicon and an amount that is at most 3% by mass of manganese.

3. The alloy according to claim 1, which further comprises an amount that is at most 10% by mass of at least one element selected from the group consisting of chromium, molybdenum, vanadium, niobium, titanium, zirconium, and tantalum.

4. The alloy according to claim 2, which further comprises an amount that is at most 10% by mass of at least one element selected from the group consisting of chromium, molybdenum, vanadium, niobium, titanium, zirconium, and tantalum.

5. A composite comprising a cemented carbide and a joining alloy joined to said cemented carbide to form an integral structure, wherein said joining alloy is an alloy as recited in claim 1.

6. A composite comprising a cemented carbide and a joining alloy joined to said cemented carbide to form an integral structure, wherein said joining alloy is an alloy as recited in claim 2.

7. A composite comprising a cemented carbide and a joining alloy joined to said cemented carbide to form an integral structure, wherein said joining alloy is an alloy as recited in claim 3.

8. A composite comprising a cemented carbide, a joining alloy joined to said cemented carbide and steel joined to said joining alloy to form an integral structure, wherein said joining alloy is an alloy as recited in claim 1.

9. A composite comprising a cemented carbide, a joining alloy joined to said cemented carbide and steel joined to said joining alloy to form an integral structure, wherein said joining alloy is an alloy as recited in claim 2.

10. A composite comprising a cemented carbide, a joining alloy joined to said cemented carbide and steel joined to said joining alloy to form an integral structure, wherein said joining alloy is an alloy as recited in claim 3.

* * * * *